United States Patent [19]

Stockburger et al.

[11] Patent Number: 4,505,471
[45] Date of Patent: Mar. 19, 1985

[54] DEVICE FOR FEEDING DATA SUPPORTS IN A PROCESSING ARRANGEMENT

[76] Inventors: Hermann Stockburger, Kirnachweg 7, D-7742 St. Georgen; Siegfried Bauer, Kussenhofstr. 16, D-7743 Furtwangen, both of Fed. Rep. of Germany

[21] Appl. No.: 565,135

[22] Filed: Dec. 27, 1983

Related U.S. Application Data

[63] Continuation of Ser. No. 284,061, Jul. 16, 1981, abandoned.

[30] Foreign Application Priority Data

Sep. 12, 1980 [DE] Fed. Rep. of Germany ....... 3034517

[51] Int. Cl.³ .............................................. B65H 9/16
[52] U.S. Cl. ................................................... 271/251
[58] Field of Search ...................... 271/248, 250, 251; 226/21

[56] References Cited

U.S. PATENT DOCUMENTS

| | | | |
|---|---|---|---|
| 2,819,078 | 1/1958 | Durand | 271/251 X |
| 3,666,262 | 5/1972 | Fowler | 271/251 |
| 3,898,432 | 8/1975 | Agnew | 271/250 X |
| 3,915,449 | 10/1975 | Johnson | 271/251 |

FOREIGN PATENT DOCUMENTS

| | | |
|---|---|---|
| 2119430 | 10/1974 | Fed. Rep. of Germany . |
| 1377846 | 12/1974 | United Kingdom . |
| 1414806 | 11/1975 | United Kingdom . |

OTHER PUBLICATIONS

IBM Technical Disclosure Bulletin, vol. 14, No. 5, pp. 1484,1485, Oct. 1971, B. D. Bergschneider et al.
IBM Technical Disclosure Bulletin, vol. 16. No. 11, pp. 3676,3677, Apr. 1974, J. Gutteling.
IBM Technical Disclosure Bulletin, vol. 20, No. 2, pp. 564–566, T. F. Flavin.

Primary Examiner—Richard A. Schacher
Attorney, Agent, or Firm—Donald Brown

[57] ABSTRACT

The device for feeding card-type data supports in a processing equipment includes a guiding path having at least one lateral abutment edge for aligning the data support during travelling from an introduction slot towards a processing position within the equipment. The data support being correctly aligned during its travel along the guiding path, it may be processed during such travel by reading and/or writing data thereon. In accordance with a preferred embodiment, the automatic feeding and alignment of the data support is achieved by a frictional guiding wheel secured on a driving shaft which in turn may be pivoted about an axis normal to the plane of the data support card. Thus, the driving wheel may pivot between two predetermined positions, and in a first position in which the data support is first engaged, it will only exert a driving force on the data support, and immediately subsequently, the driving wheel will be pivoted into the second position by engagement of its peripheral surface with the wall of the receiving zone of the data support; when in its second position, the driving wheel will simultaneously exert both the driving force and an alignment force on the data support.

16 Claims, 3 Drawing Figures

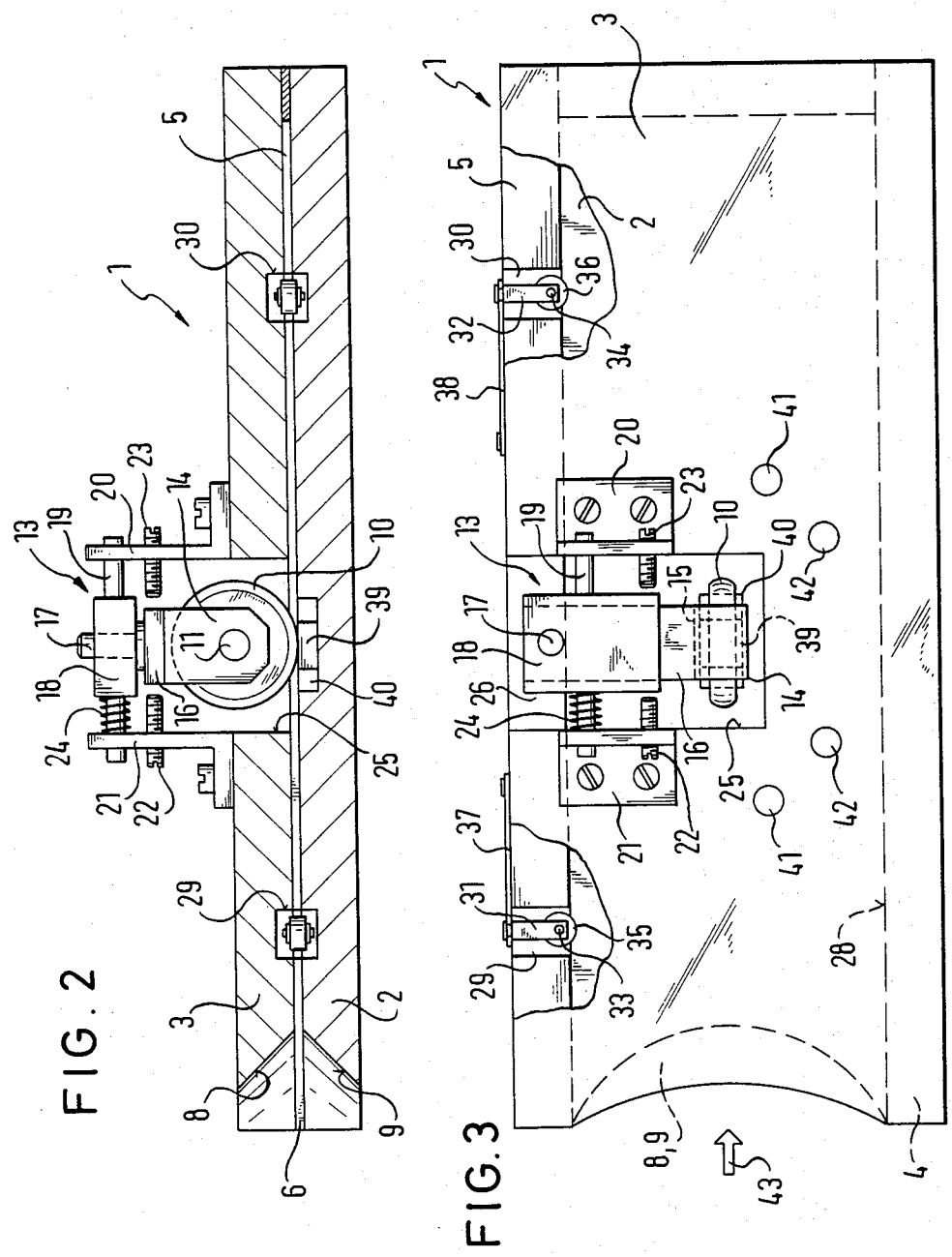

DEVICE FOR FEEDING DATA SUPPORTS IN A PROCESSING ARRANGEMENT

This application is a continuation of application Ser. No. 06/284061, filed 07/16/81, now abandoned.

BACKGROUND OF THE INVENTION

This invention generally relates to devices for feeding data supports in a processing arrangement, more particularly, devices for feeding and guiding generally flat, card-type data supports in correct alignment along an abutment edge of the guiding path extending between the input opening and the data support receiving zone of the processing arrangement.

In processing equipment for processing card-type data supports it is desired to feed the data supports with a predetermined orientation to the receiving zone in which the data support is processed. For receiving the data support within the processing equipment, the latter is provided with a gap or slot-type receiving zone the dimensions of which substantially correspond with those of the data support to be inserted therein, in order to avoid tilting of the data support within the gap or slot-type receiving space into any direction. A primary drawback of this prior art device is that only data supports of one single size may be processed and that, moreover, minor mechanical deteriorations of the data support cards would prevent automatic introduction of the data supports by a pulling-in mechanism. If the gap or slot-type receiving zone is made larger than the data support, however, a correct orientation of the data support is impossible with the prior art devices.

Another prior art device is used for bringing documents into a processing position defined by two mutually perpendicular reference edges. To this end, a driving member provided for driving the document along its travelling path is first moved into a position in which only one force component is exerted on the document when the latter is engaged by the driving member. When the document is sufficiently pulled-in by the driving member to abut against the reference edge, the position of the member is changed in a manner to exert a force component on the data support which is normal to the first mentioned force component to align the data support with respect to the second reference edge. When the final position is reached, the document may be processed. At the end of the alignment operation, the driving member is returned from the second position in its starting position under the action of a return spring, so that the device will be ready for pulling-in of another document.

OBJECTS OF THE INVENTION

It is a primary object of the invention to provide a device for feeding generally flat, card-type data supports in a processing arrangement allowing proper alignment of the data support already during the phase of introduction of the data support.

A further object of the invention is to provide a device for feeding a generally flat, card-type data support in a processing station allowing the data support to be properly aligned even during its return movement for restitution from the processing equipment.

A related object of the invention is to provide a device for feeding generally flat, card-type data supports in a processing equipment allowing reading and/or writing operations to be performed on the data support already when the latter is travelling along the guiding path leading towards its processing position and during the reverse movement.

SUMMARY OF THE INVENTION

In accordance with the invention, the device for feeding generally flat, card-type data supports in a processing equipment has a receiving zone for receiving the data support and an opening for insertion of the data support. A guiding path extends between the opening and the receiving zone. The guiding path comprises an abutment edge for abutment of one lateral edge of the data support. For moving the data supports from the opening towards the receiving zone along the guiding path and vice-versa, driving means are provided which are adapted to engage the data support in a manner to simultaneously exert thereon a driving force directed parallel to the guiding path and an alignment force directed towards the abutment edge. Thus, as soon as a data support is engaged by the driving member, preferably a frictional wheel, it will be simultaneously subjected to both a driving force directed parallel to the guiding path and an alignment force directed normally to the moving direction and towards the abutment edge. Thus, processing of the data support by reading and/or writing data thereon may be formed even during the feeding operation.

Further features, objects and advantages of the invention will stand out from the following non-limitative description of examplary embodiments with reference to the drawings. In the drawings:

FIG. 2 is a lateral view of the device of FIG. 1 along line II—II in FIG. 1; and FIG. 3 is a plan view of the device.

Figure 1:
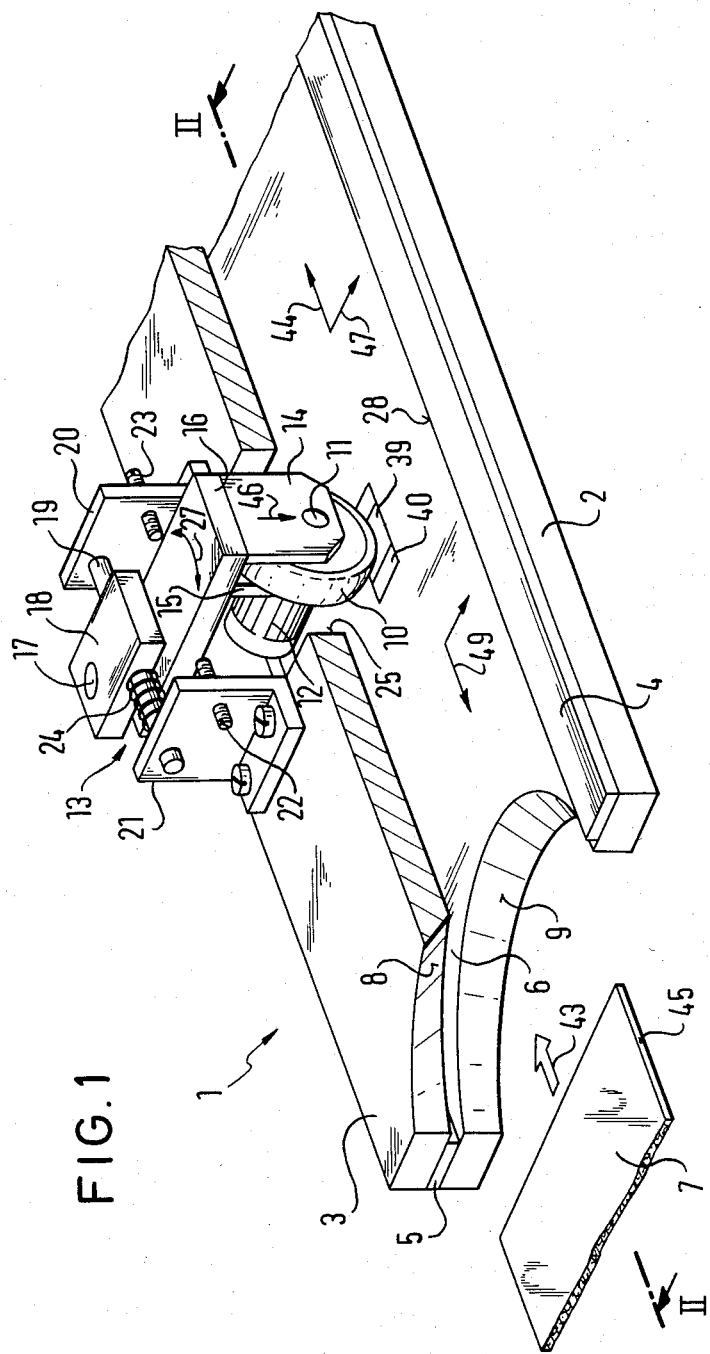
FIG. 1 shows a perspective lateral view of the device in partially broken-away representation.

The device generally indicated at 1 has a base plate 2 and a cover plate 3. Between these two plates, two strips 4, 5 are laterally arranged for holding the plates in spaced relationship. A slot-type zone 6 is formed between the plate and the lateral strips for receiving a data support 7.

At one end of the zone 6, the base plate 2 and the cover plate 3 have recesses of circle segment shape. As best seen in FIG. 1, the walls 8, 9 defining the recesses are bevelled in a direction towards the slot inside. In this manner, an opening of the slot-type zone is formed into which the data support 7 may be easily introduced. When the data support is pulled out, it is sufficiently pushed back into the opening so that it projects into the circular segment shaped recess and may be seized.

A wheel 10 is provided in the centre of the slot-shaped zone 6, when seen in longitudinal direction thereof. This is mounted on a shaft 11 which may be driven by a motor 12. The shaft 11 is supported in arms 14, 15 secured on a support 16 connected to a shaft 17 arranged perpendicularly to the plane of the slot-formed zone 6. The shaft 17 is in turn connected with a support 18, in such a manner that the support 16 is pivotable in a plane parallel to the plane of the slot-shaped zone. A shaft 19 pivotably connects the support 18 to lateral arms 20, 21 secured on the frame. The shaft 19 is arranged to be perpendicular to the shaft 17 and parallel to the longitudinal direction of the slot-shaped zone 6. This provides a universal joint 13 for supporting the shaft 11 on the wheel 10. The arms 20, 21 are provided with adjustment screws 22, 23 laterally engaging the support 16 to limit the horizontal deflection of the support 16 about the shaft 17 in adjustable manner.

The cover plate 3 is provided with a recess 25 through which the wheel 10 extends through the cover plate 3 and rests on the base plate 2 or a data support pushed in into the slot-shaped zone 6. The support 16 and thus the wheel 10 is biased downwardly towards the base plate 2 by a suitable spring bias which, in the embodiment shown, is caused by a spring 24 arranged about the shaft 19 and engaging an abutment of the arm 21 on one of its ends.

As best seen in FIG. 3, the shaft 17 is arranged near one lateral edge 26 of the slot-shaped zone 6 and, in longitudinal direction, in the centre of the slot-formed zone 6. The length of the support 16 is selected in a manner that the wheel 10, as best seen in FIG. 3, extends substantially to the centre of the slot-formed zone 6. The wheel may thus be pivoted in a plane parallel to the plane of the slot-shaped zone 6 in the direction of an arrow 27 about the shaft 17. The base and cover plates 2, 3, the supports 16, 18 and the arsm 20, 21 may e.g. be formed of a suitable plastics material. The strips 4, 5 which may simultaneously be used as the abutment edge, are preferably formed of a suitable abrasion resistive material. The base and cover plates and the strips 4, 5 may e.g. be connected by an adhesive. In the embodiment shown, the arms are screwed to the cover plate, but an adhesive connection may be provided in this instance, too. In the embodiment shown, the motor 12 is screwed to the arms 15, the screws being not shown in the drawings.

On the side of the slot-shaped zone 6 on which the vertical axis 17 of the universal joint is provided, and on the side of the slot-formed zone 6, recesses 29, 30 spaced from the shaft 17 are provided in the lateral wall, as best seen in FIG. 3, through which gliding rollers 35, 36 extend into the slot-shaped zone 6, these gliding rollers being supported by appropriate mounting members 31, 32 and on vertical axes 33, 34. On their outer ends, the mounting members 31, 32 are slightly biased into the slot-shaped zone 6, by leaf springs 37, 38 screwed on the outer wall of the device.

As best seen in FIG. 3, a magnetic head 39 of a reading and/or writing arrangement is provided on the base plate 2. It is arranged in a manner to lie on a straight line passing through a rotational axis formed by the shaft 17 and extending perpendicularly to the longitudinal direction of the slot-shaped zone 6 and, more particularly, to the abutment edge 28. As seen in FIG. 3, the magnetic head 39 is mounted in a fixture 40 allowing an adjustment, particularly an adjustment about an axis passing through the above mentioned straight line and directed perpendicularly to the plane of the slot-shaped zone.

Bores 41, 42 are provided in the base and/or cover plates 2, 3, and appropriate transmitter or receiver means are arranged therein for detecting information of the data support 7.

In operation, the data support 7 is first pushed in into the slot-shaped zone 6 in the direction of arrow 43 and on the side of the circle segment shaped recess until a resistance is encountered when the data support 7 reaches the wheel 10. When an information already stored on the data support 7 is to be read, or when an information is to be recorded on the data support, the motor 12 is switched on to rotate the wheel 10 in counterclockwise direction, as shown in FIG. 1. The wheel 10 being spring biased, it will first run on the base plate 2, thereby providing pivotal movement of the shaft 11 about the axis 17 towards the entrance side of the slot-formed zone 6 towards the data support. The wheel 10 will thus engage the introduced data support 7 and move the same over the magnetic head 39 in the direction of arrow 44 until the data support has passed under the wheel 10, so that the wheel 10 will again engage the base plate 2 on its surface. Because of the above mentioned pivotal movement of the shaft 11 of the wheel 10, a force component will be effective in the direction of arrow 44, and a second force component will be effective in a direction (arrow 47) perpendicular thereto and towards the abutment edge 28, when the data support is advanced in the manner above disclosed. As a result, the data support 7 which is preferably narrower than the slot-shaped zone 6, will always be aligned with one of its lateral edges 45 along the abutment edge 28, during its advancing movement.

When the data support 7 fed over the magnetic head 39 is to be moved back in the opposite direction towards the entrance of the slot-shaped zone, the motor 12 is switched on to rotate the wheel 10 in clockwise direction, as seen in FIG. 1. As the wheel 10 will be in engagement with the base plate 2, the shaft 11 will again first be pivoted and thus the wheel 10 is pivoted about axis 17 away from the entrance of the slot-shaped zone towards the data support, the wheel 10 thus engaging the data support 7 which had previously been advanced, to move the same over the magnetic head 39 towards the entrance of the slot-shaped zone 6. Because of the pivotal movement of the shaft 11 and thus the wheel 10 in the manner above disclosed, the wheel 10 will now cause a force component acting on the data support 7 in a direction opposite to the direction of arrow 49 and a second component which is again perpendicular to the abutment edge 28, whereby, on the one hand, the data support 7 is moved over the magnetic head 39 and back towards the entrance side and, on the other hand, will always be moved aligned on its lateral edge 45 with the abutment edge 28. The alignement of the data support 7 with the abutment edge 28 is still enhanced by the biasing tension caused by the gliding rollers 35, 36.

Through the adjustment screws 22, 23, the respective pivotal movement of the shaft 11 about axis 17 may be adjustably limited.

By spring biasing the wheel 10 towards the base plate 2 in the direction of arrow 46, a sufficient contact between the wheel 10 and the data support for moving the same will always be achieved, even upon use of data supports having different thicknesses. For appropriate engagement with the data support, the wheel 10 preferably has a rubber envelope of high frictional resistance.

Thus, with the above disclosed device, it will be achieved that a data support may be introduced onto a data recognition arrangement for reading or writing data with a predetermined and highly accurate position, using a simple mechanism.

In the above disclosed examplary embodiment, the card to be pulled-in was generally termed a data support. The data support may be a credit card, a cheque card, another kind of value card or an identity card.

In the above examplary embodiment, the member for moving the data support is shown as a wheel. Generally, other appropriate members may be used which would move the data support in such a manner that a force component would always be effective in the moving direction, and another component towards the abutment edge. Another examplary embodiment of such member would be a catch member shaped as a bident member provided instead of the wheel 10 and driven in such a manner that, for moving the card in one direction, it will engage on one of its teeth, the member being driven in such a manner that its centre axis corresponding to the support 16 or the shaft 11, will always be moved from its deflected position towards the card into the neutral position. Upon movement in the opposite direction, the bident member would then engage through its second engagement member on the card and guide the same from a deflected position directed towards the card, into the neutral zero position.

What is claimed is:

1. A device for feeding a card-type data support in a processing arrangement having a receiving zone for receiving said data support with a baseplate forming the bottom of the receiving zone, a lateral guidestrip forming an abutment edge and an opening for insertion of said data support, the device further comprising driving means for moving said data support, said driving means comprising a driving wheel rotatable around a driving shaft which is arranged to lie on a straight line passing through an axis normal to said baseplate and to be pivotable around that axis, said axis being deposited at one side of said receiving zone and said driving wheel being offset from that axis towards the center of said receiving zone and biased towards said baseplate, whereby said driving shaft is pivoted around that axis by the rolling movement of said driving wheel on said baseplate.

2. The device of claim 1, wherein when moving said data support from said opening to said receiving zone said driving wheel together with said driving shaft are pivoted about said axis towards said opening.

3. The device of claim 1, wherein when moving said data support in a direction from said receiving zone towards said opening said driving wheel together with said driving shaft are pivoted away from said opening about said axis.

4. The device of claims 1, wherein said driving shaft is pivotable about said axis by an adjustable angle.

5. The device of claim 1, wherein said driving shaft is supported pivotably in a plane perpendicular to the plane surface defined by said receiving zone.

6. The device of claim 1, wherein said receiving zone is dimensioned to be larger than the dimensions of said data support.

7. The device of claim 1, wherein data reading and/or writing means are provided in said baseplate and wherein said data reading and/or writing means and said driving wheel register, when said driving shaft is normal to said abutment edge.

8. A device for feeding a card-type data support in a processing arrangement having a receiving zone for receiving said data support with a baseplate forming the bottom of the receiving zone, a lateral guidestrip forming an abutment edge and an opening for insertion of said data support, the device further comprising driving means for moving said data support, said driving means comprising a driving wheel rotatable around a driving shaft which is pivotable about an axis normal to said baseplate, wherein said driving wheel is biased towards said baseplate such that the rotation of said wheel effects said pivotal movement of said driving shaft towards said opening by engagement of said wheel with said baseplate, thereby driving said wheel into engagement with said data support and effects the movement of said data support after engaging said data support.

9. The device of claim 8, wherein when moving said data support in a direction from said receiving zone towards said opening said driving wheel together with said driving shaft are pivoted away from said opening about said axis.

10. The device of claim 8, wherein adjustment screws are provided for limiting the pivoting movement of said driving shaft about said axis.

11. A device for feeding a card-type data support in a processing arrangement having a receiving zone for receiving said data support, an opening for insertion of said data support, a guiding path extending from said opening to said receiving zone and comprising an abutment edge for abutment of one lateral edge of said data support, and means for moving said data support comprising driving means exerting a first driving force component in the direction from said opening to said receiving zone in the first position thereof on said data support and being movable to a second position in which it exerts a second driving force component directed towards said abutment edge on said data support during the movement thereof from said opening to said receiving zone, wherein said driving means is movable to a position in which it acts on said data support to exert a driving force component directed from said receiving zone to said opening and a driving force component directed towards said abutment edge.

12. The device of claim 11, wherein the driving means is pivotable by an adjustable angle about an axis normal to said plane surface defined by that receiving zone.

13. The device of claim 12, wherein adjustment screws are provided for limiting the pivoting movement of said driving means about said axis.

14. The device of claim 11, wherein said driving means is supported pivotably in a plane perpendicular to the plane surface defined by said receiving zone.

15. The device of claim 11, wherein said receiving zone is dimensioned to be larger than the dimensions of said data support.

16. The device of claim 11, wherein data reading and/or writing means are provided in said baseplate and wherein said data reading and/or writing means and said driving means register, when said driving means is in said first position.

* * * * *